US012111677B2

(12) United States Patent
Yuan et al.

(10) Patent No.: US 12,111,677 B2
(45) Date of Patent: Oct. 8, 2024

(54) BUTTON, BUTTON ASSEMBLY AND ALERT DEVICE

(71) Applicant: WISTRON CORP., New Taipei (TW)

(72) Inventors: Chien-Hao Yuan, New Taipei (TW); Hengmin Liu, New Taipei (TW)

(73) Assignee: WISTRON CORP., New Taipei (TW)

( * ) Notice: Subject to any disclaimer, the term of this patent is extended or adjusted under 35 U.S.C. 154(b) by 0 days.

(21) Appl. No.: 18/061,017

(22) Filed: Dec. 2, 2022

(65) Prior Publication Data

US 2024/0028062 A1 Jan. 25, 2024

(30) Foreign Application Priority Data

Jul. 22, 2022 (TW) .................................. 111127553

(51) Int. Cl.

*G05G 1/02* (2006.01)
*G05G 5/04* (2006.01)
*G05G 5/05* (2006.01)
*H01H 13/14* (2006.01)
*H01H 13/86* (2006.01)

(52) U.S. Cl.

CPC ................ *G05G 1/02* (2013.01); *G05G 5/04* (2013.01); *G05G 5/05* (2013.01); *H01H 13/14* (2013.01); *H01H 13/86* (2013.01); *G05G 2505/00* (2013.01); *H01H 2221/044* (2013.01)

(58) Field of Classification Search

CPC .. G05G 1/02; G05G 5/04; G05G 5/05; G05G 2505/00; H01H 13/14; H01H 13/86; H01H 2221/044; H01H 3/12; H01H 13/04; H01H 13/50; H01H 13/52; H01H 13/70; H01H 13/705

See application file for complete search history.

(56) References Cited

U.S. PATENT DOCUMENTS 5,172,990 A * 12/1992 Weng .................. H01H 13/705 200/341
5,399,824 A * 3/1995 Chen .................... H01H 13/705 200/534
5,862,071 A * 1/1999 Scholder ................ H01H 13/52 365/63

FOREIGN PATENT DOCUMENTS

CN 201167044 Y 12/2008

OTHER PUBLICATIONS

TW Office Action dated Jul. 18, 2023 in Taiwan application No. 111127553.

* cited by examiner

*Primary Examiner* — Lheiren Mae A Caroc

(74) *Attorney, Agent, or Firm* — McClure, Qualey & Rodack, LLP

(57) ABSTRACT

An alert device includes a button assembly and an alert switch. The button assembly includes a casing and a button. The casing has a first through hole and a plurality of second through holes. The button includes a pressed part, an activation part and a plurality of hook parts. The pressed part has a central portion and a non-central portion, the non-central portion is connected to the central portion, the activation part is connected to the central portion, the plurality of hook parts are connected to the non-central portion, the activation part is disposed through the first through hole, and each of the plurality of hook parts is respectively disposed through each of the plurality of second through holes and is connected to the casing. The alert switch is disposed corresponding to the activation part.

19 Claims, 11 Drawing Sheets

BUTTON, BUTTON ASSEMBLY AND ALERT DEVICE

CROSS-REFERENCE TO RELATED APPLICATIONS

This non-provisional application claims priority under 35 U.S.C. § 119(a) on Patent Application No(s). 111127553 filed in Taiwan, R.O.C. on Jul. 22, 2022, the entire contents of which are hereby incorporated by reference.

TECHNICAL FIELD

The disclosure provides a button, a button assembly and an alert device, more particularly to a button, a button assembly including the button and an alert device including the button assembly.

BACKGROUND

In general, an electronic device is provided with a button and a switch corresponding to the button, and when the button is pressed, the switch can be activated for the electronic device to perform the function controlled by the switch. Taking an alert device located aside a hospital bed for instance, when a patient is in an urgent condition, the patient can press a button of the alert device to activate a switch of the alert device for sending a notification to doctors or nurses.

In order to enable the patient to identify the button of the alert device, the button is generally designed to be as large as possible. However, when the position where the patient presses on this large button is far away from the center of the button, an opposite side to the position being pressed on the button may tilt up, which causes the button to move in an undesired path, and thus the switch may not be activated. Therefore, how to solve the aforementioned issues is one of the crucial topics in this field.

SUMMARY

The disclosure provides a button, a button assembly and an alert device which enable the button to successfully activate a switch after being pressed.

One embodiment of the disclosure provides a button assembly. The button assembly is configured to activate a switch. The button assembly includes a casing and button. The casing has a first through hole and a plurality of second through holes. The button includes a pressed part, an activation part and a plurality of hook parts. The pressed part has a central portion and a non-central portion, the non-central portion is connected to the central portion, the activation part is connected to the central portion, the plurality of hook parts are connected to the non-central portion, the activation part is disposed through the first through hole, and each of the plurality of hook parts is respectively disposed through each of the plurality of second through holes and is connected to the casing.

Another embodiment disclosure provides an alert device. The alert device includes a button assembly and an alert switch. The button assembly includes a casing and a button. The casing has a first through hole and a plurality of second through holes. The button includes a pressed part, an activation part and a plurality of hook parts. The pressed part has a central portion and a non-central portion, the non-central portion is connected to the central portion, the activation part is connected to the central portion, the plurality of hook parts are connected to the non-central portion, the activation part is disposed through the first through hole, and each of the plurality of hook parts is respectively disposed through each of the plurality of second through holes and is connected to the casing. The alert switch is disposed corresponding to the activation part.

Still another embodiment of the disclosure provides a button. The button includes a pressed part, an activation part and a plurality of hook parts. The pressed part has a central portion, a non-central portion and an outer annular edge. The non-central portion is connected to the central portion, and the outer annular edge is connected to the non-central portion. The activation part is connected to the central portion. The plurality of hook parts are connected to the non-central portion. A distance from each of the plurality of hook parts to the activation part is greater than a distance from each of the plurality of hook parts to the outer annular edge.

According to the button, the button assembly and the alert device as described above, since the hook parts of the button are connected to the non-central portion of the pressed part, and each of the hook parts is respectively disposed through each of the second through holes and are connected to the casing, the non-central portion of the pressed part of the first button is prevented from tilting up when the non-central portion of the pressed part of the button is pressed downwards, thereby ensuring the button to be moved in a desired path so as to successfully activate the first switch.

BRIEF DESCRIPTION OF THE DRAWINGS

The present disclosure will become better understood from the detailed description given herein below and the accompanying drawings which are given by way of illustration only and thus are not intending to limit the present disclosure and wherein.

DETAILED DESCRIPTION

Figure 1:
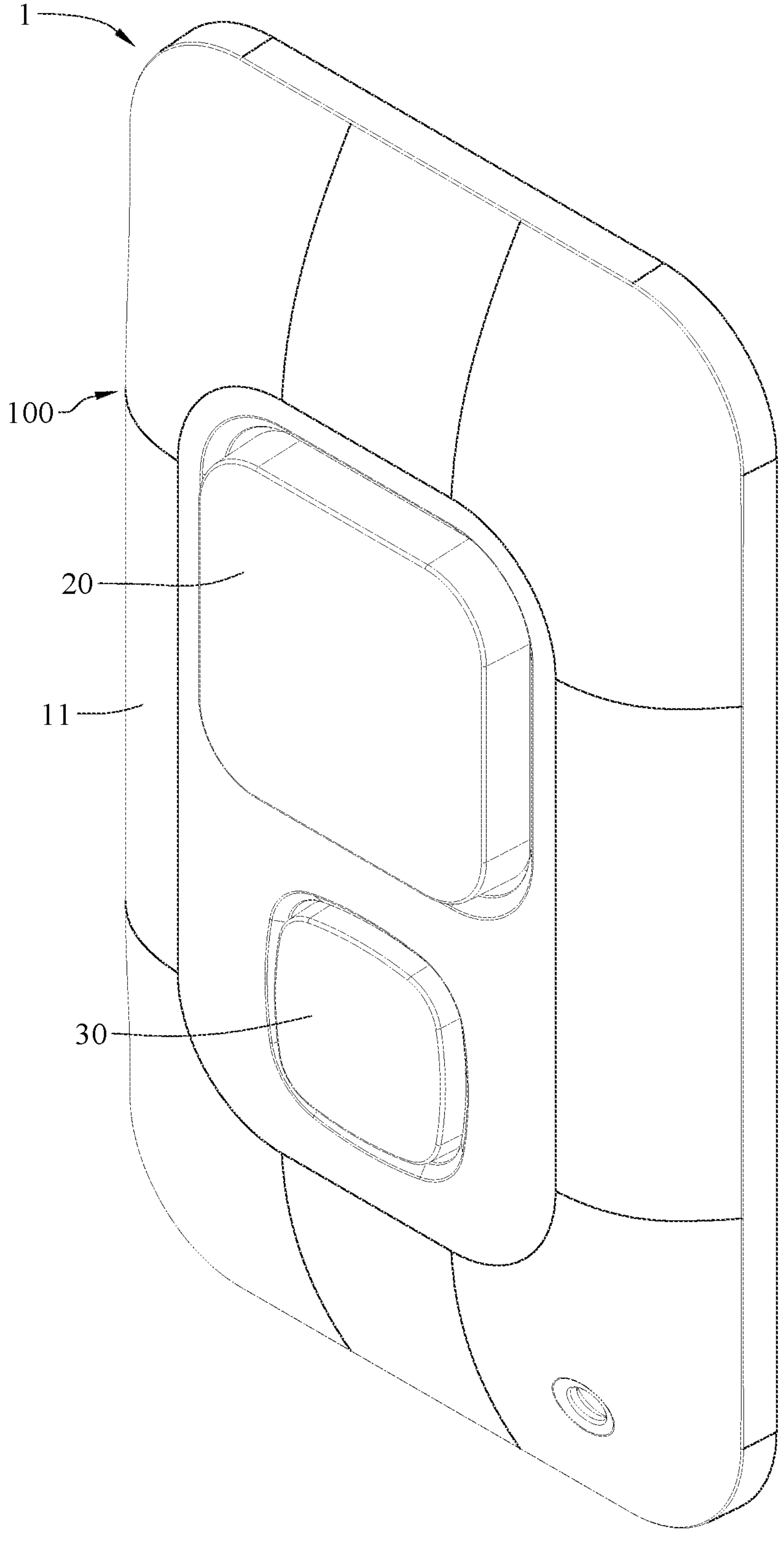
FIG. 1 is a perspective view of an alert device according to a first embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In addition, the terms used in the present disclosure, such as technical and scientific terms, have its own meanings and can be comprehended by those skilled in the art, unless the terms are additionally defined in the present disclosure. That is, the terms used in the following paragraphs should be read on the meaning commonly used in the related fields and will not be overly explained, unless the terms have a specific meaning in the present disclosure.

Figure 2:
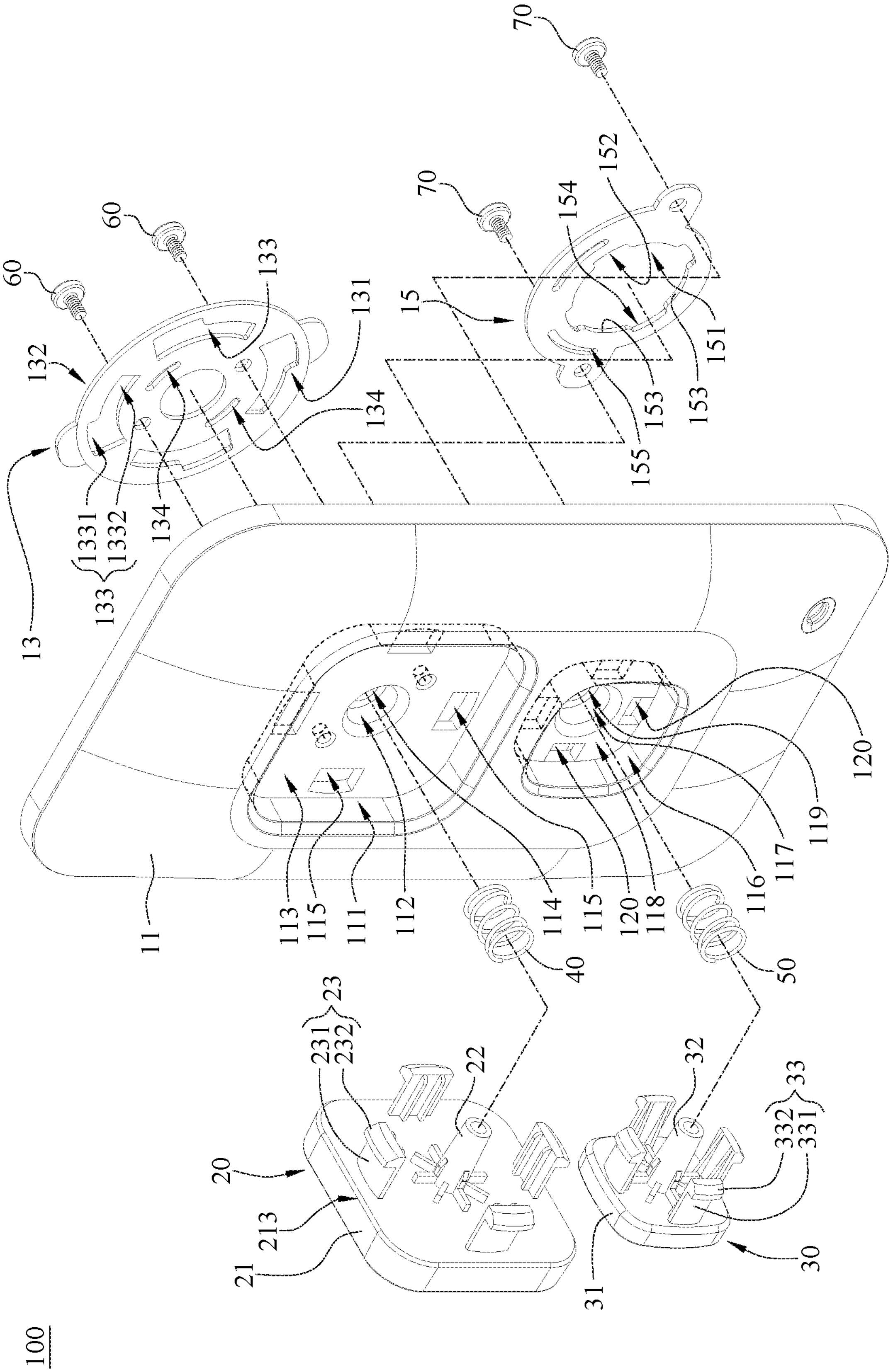
FIG. 2 is an exploded view of a button assembly of the alert device in FIG. 1.
Figure 3:
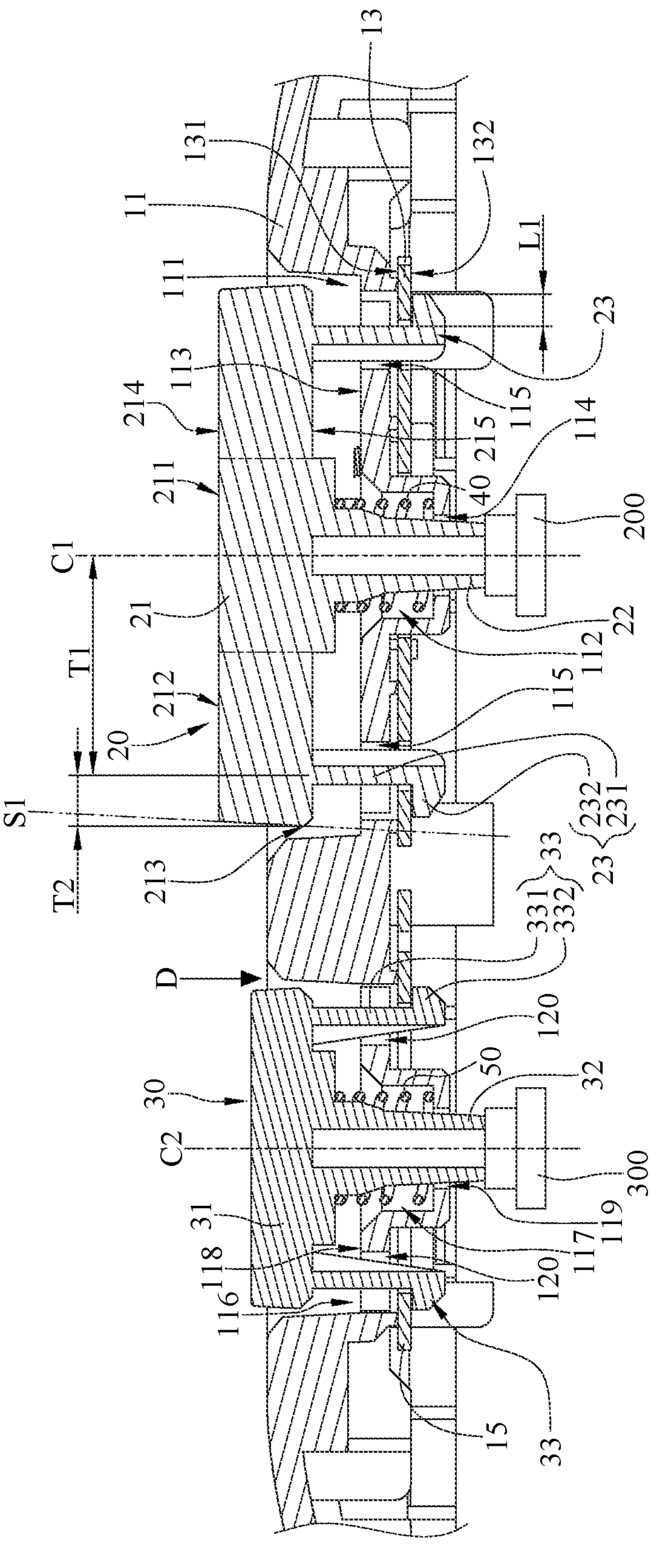
FIG. 3 is a cross-sectional view of the alert device in FIG. 1.

Refer to FIGS. 1 to 3, where FIG. 1 is a perspective view of an alert device 1 according to a first embodiment of the disclosure, FIG. 2 is an exploded view of a button assembly 100 of the alert device 1 in FIG. 1, and FIG. 3 is a cross-sectional view of the alert device 1 in FIG. 1.

In this embodiment, the alert device 1 includes a button assembly 100 and a first switch 200. In addition, the alert device 1 may further include a second switch 300 and other components, such as a base, a circuit board and so on. In order to clearly show the structures of the button assembly 100 and the activation processes of the first switch 200 and the second switch 300 by the button assembly 100, parts of the alert device 1 are omitted in figures, and the figures merely show the button assembly 100, the first switch 200 and the second switch 300.

The button assembly 100 includes a casing 11 and a first button 20. In addition, the button assembly 100 may further include a second button 30, a first elastic component 40 and a second elastic component 50.

In this embodiment, figures merely show one part of the casing 11 and omit the other part of the casing 11 for clearly showing the connections among the casing 11, the first button 20, the second button 30, the first elastic component 40 and the second elastic component 50. The casing 11 is, for example, made of plastic material. The casing 11 has a first button recess 111, a first accommodation recess 112, a first stopping surface 113, a first through hole 114, four second through holes 115, a second button recess 116, a second accommodation recess 117, a second stopping surface 118, a third through hole 119 and four fourth through holes 120. The first stopping surface 113 is located at the bottom of the first button recess 111 and faces an opening of the first button recess 111. The first accommodation recess 112 is recessed from the first stopping surface 113 and connected to the first button recess 111. The first through hole 114 is located at one side of the first accommodation recess 112 located opposite to the first button recess 111, and the second through holes 115 are located at the first stopping surface 113. The second stopping surface 118 is located at the bottom of the second button recess 116 and faces an opening of the second button recess 116. The second accommodation recess 117 is recessed from the second stopping surface 118 and connected to the second button recess 116. The third through hole 119 is located at one side of the second accommodation recess 117 located opposite to the second button recess 116, and the fourth through holes 120 are located at the second stopping surface 118.

The first button 20 includes a pressed part 21, an activation part 22 and four hook parts 23. The pressed part 21 is, for example, a square plate with a side length larger than 15 mm, such as a square plate with the side length of 25 mm. The pressed part 21 is configured to be pushed by, for example, a finger of a user. The pressed part 21 has a central portion 211, a non-central portion 212 and an outer annular edge 213. The central portion 211 is an extent of a projection of the finger on the pressed part 21 when the fingertip is aligned with a central line C1 of the central portion 211 (e.g., the extent of a diameter of about 12 mm), where the central line C1 is, for example, approximately perpendicular to a surface of the pressed part 21 that is for the contact of the finger. The non-central portion 212 of the pressed part 21 surrounds the central portion 211, and the central portion 211 and the non-central portion 212 together form a first surface 214 and a second surface 215 facing away from the first surface 214, and the outer annular edge 213 surrounds the non-central portion 212 and is connected to a periphery of the second surface 215. The activation part 22 is connected to the central portion 211 and located at the second surface 215, and the hook parts 23 are connected to the non-central portion 212 and located at the second surface 215. Then, the following will introduce the detail structures of the hook parts 23. Each of the hook parts 23 includes a connection arm 231 and a hook structure 232. In each of the hook parts 23, the connection arm 231 is connected to the non-central portion 212 of the pressed part 21 and located at the second surface 215, the hook structure 232 protrudes from the connection arm 231, and an extension direction of the connection arm 231 from the non-central portion 212 is different from a protruding direction of the hook structure 232 from the connection arm 231, where a length L1 that the hook structure 232 protrudes from the connection arm 231 is equal to or larger than 0.8 mm; preferably, the length L1 that the hook structure 232 protrudes from the connection arm 231 is equal to or larger than 1.2 mm. A distance T1 from the connection arm 231 of each of the hook parts 23 to the central line of the activation part 22 (e.g., coaxial with the central line C1 of the central portion 211) is larger than a distance T2 from the connection arm 231 of each of the hook parts 23 to an extension surface S1 of the outer annular edge 213. The hook structures 232 of the hook parts 23 are entirely located in an area surrounded by the extension surface S1 of the outer annular edge 213.

Note that the extent of the central portion 211 of the pressed part 21 is not restricted to being an extent having a diameter of 12 mm; in some other embodiments, and the extent of the central portion 211 of the pressed part 21 may be modified to be an extent of a diameter larger or smaller than 12 mm according to actual design requirements.

The activation part 22 of the first button 20 is disposed through the first through hole 114 of the casing 11, the first stopping surface 113 of the casing 11 faces the second surface 215 of the pressed part 21 of the first button 20, each of the connection arms 231 of the hook parts 23 of the first button 20 is respectively disposed through each of the second through holes 115 of the casing 11 and is connected to the casing 11, and the hook structures 232 of the hook parts 23 are located at one side of the casing 11 located opposite to the first stopping surface 113. The first switch 200 is, for example, an alert switch. The first switch 200 is located in the casing 11 and corresponds to the activation part 22 of the first button 20.

The second button 30 includes a pressed part 31, an activation part 32 and four hook parts 33. A size of the pressed part 31 of the second button 30 is smaller than that of the pressed part 21 of the first button 20. The pressed part 31 of the second button 30 is, for example, a square plate with a side length smaller than or equal to 15 mm. The activation part 32 and the hook parts 33 are connected to the pressed part 31, and the hook parts 33 are located at a periphery of the activation part 32. Each of the hook parts 33 includes a connection arm 331 and a hook structure 332. In each of the hook parts 33, the connection arm 331 is connected to the pressed part 31, the hook structure 332 protrudes from the connection arm 331, and an extension direction of the connection arm 331 from the pressed part 31 is different from a protruding direction of the hook structure 332 from the connection arm 331.

The activation part 32 of the second button 30 is disposed through the third through hole 119 of the casing 11, and the second stopping surface 118 of the casing 11 faces the pressed part 31. Each of the connection arms 331 of the hook parts 33 of the second button is respectively disposed through each of the fourth through holes 120 of the casing 11 and is connected to the casing 11. The second switch 300 is, for example, a power switch or a switch of another function. The second switch 300 is located in the casing 11 and corresponds to the activation part 32 of the second button 30.

The first elastic component 40 is, for example, a compression spring. The first elastic component 40 is located in the first accommodation recess 112, and two opposite sides of the first elastic component 40 respectively press against the pressed part 21 of the first button 20 and an inner bottom surface of the first accommodation recess 112. The first elastic component 40 is configured to force the pressed part 21 to move away from the first stopping surface 113. The second elastic component 50 is, for example, a compression spring. The second elastic component 50 is located in the second accommodation recess 117, and two opposite ends of the second elastic component 50 respectively press against the pressed part 31 of the second button 30 and an inner bottom surface of the second accommodation recess 117. The second elastic component 50 is configured to force the pressed part 31 to move away from the second stopping surface 118.

In this embodiment, the button assembly 100 may further include a first mount piece 13 and a second mount piece 15. The first mount piece 13 is, for example, a metal sheet. The first mount piece 13 has a contact surface 131, a pressed surface 132, four mounting holes 133 and a plurality of curved guiding holes 134. The pressed surface 132 faces away from the contact surface 131. Each of the mounting holes 133 has a released portion 1331 and an engagement portion 1332 connected to each other. The engagement portion 1332 has a width smaller than that of the released portion 1331. The curved guiding holes 134 are located closer to the center of the first mount piece 13 than the mounting holes 133. The second mount piece 15 is, for example, a metal sheet. The second mount piece 15 has a through hole 151, an inner annular surface 152, four engagement protrusions 153, four mount recesses 154 and a plurality of curved guiding holes 155. The inner annular surface 152 forms the through hole 151. The engagement protrusions 153 protrude from the inner annular surface 152, and each of the mount recesses 154 is formed between two of the engagement protrusions 153 which are located adjacent to each other. The curved guiding holes 155 are located at a periphery of the through hole 151.

Figure 4:
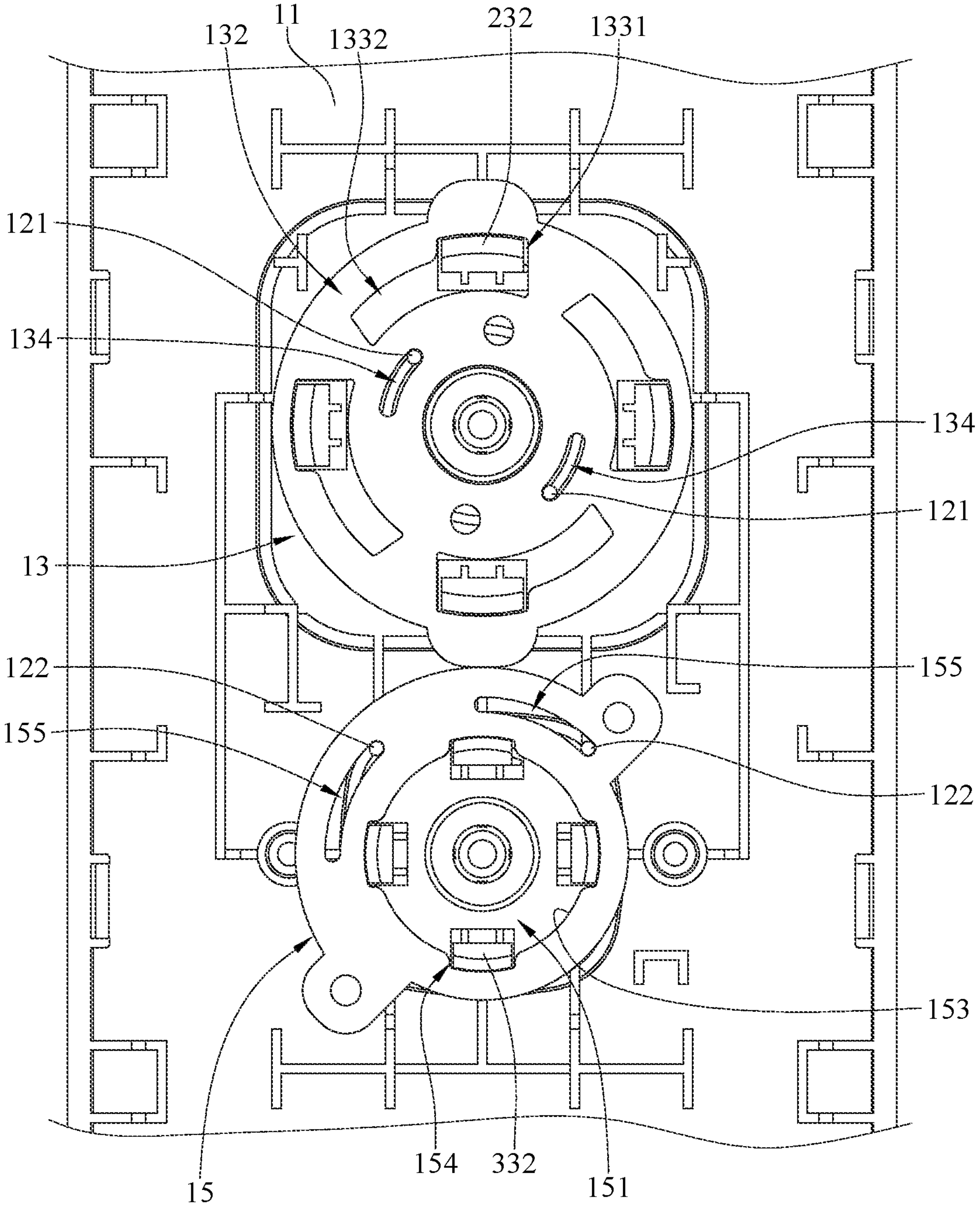
FIGS. 4 and 5 are bottom views showing that an installation of a mount piece onto a casing.
Figure 5:
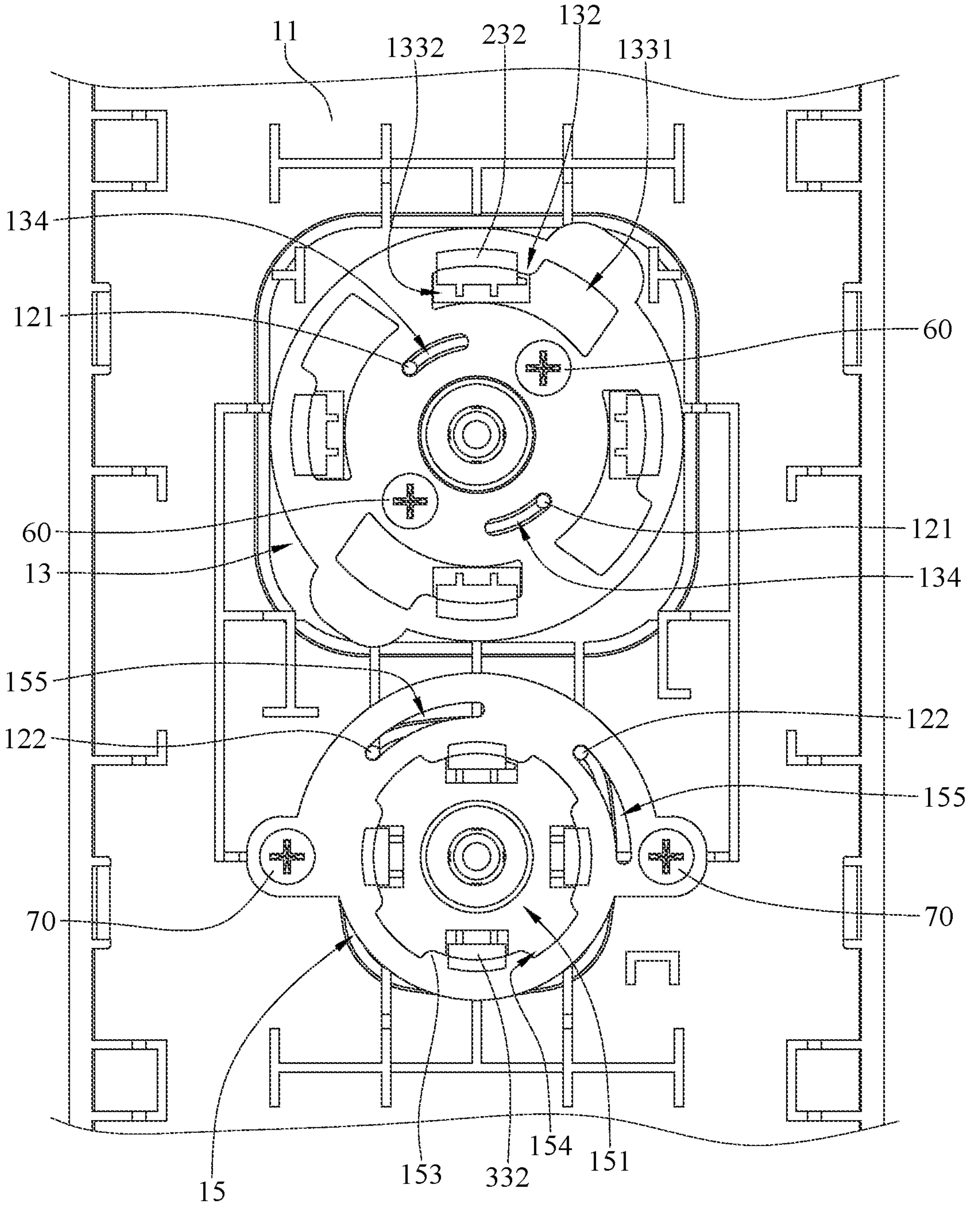

Then, the following paragraphs will introduce the structures of the casing 11 that is cooperated with the first mount piece 13 and the second mount piece 15 and the installation processes of the first mount piece 13 and the second mount piece 15. Refer to FIGS. 2, 4 and 5, where FIGS. 4 and 5 are bottom views showing that an installation of a mount piece onto a casing.

In this embodiment, the casing 11 may further have a plurality of first guiding protrusions 121 and a plurality of second guiding protrusions 122. The first guiding protrusions 121 protrude from a surface of the casing 11 facing away from the first stopping surface 113. The second guiding protrusions 122 protrude from a surface of the casing 11 facing away from the second stopping surface 118. In addition, the alert device 1 may further include a plurality of first screws 60 and a plurality of second screws 70.

During the installation of the first mount piece 13 onto the casing 11, each of the hook structures 232 of the hook parts 23 of the first button 20 is respectively disposed through each of the released portions 1331 of the mounting holes 133 of the first mount piece 13, each of the first guiding protrusions 121 is respectively disposed through each of the curved guiding holes 134 of the first mount piece 13, and the contact surface 131 of the first mount piece 13 is in contact with the casing 11. Then, the first mount piece 13 is rotated, such that each of the connection arms 231 of the hook parts 23 of the first button 20 is respectively located at each of the engagement portions 1332 of the mounting holes 133 of the first mount piece 13, and the hook structures 232 of the hook parts 23 of the first button 20 are engaged with the pressed surface 132 of the first mount piece 13 facing away from the first stopping surface 113. Then, the first screws 60 are disposed through the first mount piece 13 and screwed into the casing 11 so as to complete the installation of the first mount piece 13.

During the installation of the second mount piece 15 onto the casing 11, each of the hook structures 332 of the hook parts 33 of the second button 30 is respectively disposed through each of the mount recesses 154 of the second mount piece 15, the connection arms 331 of the hook parts 33 of the second button 30 are disposed through the through hole 151, and each of the second guiding protrusions 122 is respectively inserted into each of the curved guiding holes 155 of the second mount piece 15. Then, the second mount piece 15 is rotated, such that each of the hook structures 332 of the hook parts 33 of the second button 30 is respectively engaged with each of the engagement protrusions 153 of the second mount piece 15. Then, the second screws 70 are disposed through the second mount piece 15 and screwed into the casing 11 so as to complete the installation of the second mount piece 15.

In this embodiment, the cooperation of the curved guiding holes 134 of the first mount piece 13 and the first guiding protrusions 121 of the casing 11 can guide the first mount piece 13 during the rotation of the first mount piece 13. Similarly, the cooperation of the guiding holes 155 of the second mount piece 15 and the second guiding protrusions 122 of the casing 11 can guide the second mount piece 15 during the rotation of the second mount piece 15. Note that the curved guiding holes 134 of the first mount piece 13, the guiding holes 155 of the second mount piece 15, the first guiding protrusions 121 and the second guiding protrusions 122 of the casing 11 are optional structures and may be omitted in some other embodiments.

Note that the structure of the first mount piece 13 is not restricted in the disclosure; in some other embodiments, the structure of the first mount piece may be similar to that of the second mount piece 15; that is, the first mount piece may have structures similar to the through hole 151, the inner annular surface 152, the engagement protrusions 153, the mount recesses 154 and the curved guiding holes 155. Similarly, in another embodiment, the structure of the second mount piece may be similar to that of the first mount piece 14.

Note that the quantities of the second through holes 115 and the fourth through holes 120 of the casing 11, the quantity of the hook parts 23 of the first button 20, the quantity of the hook parts 33 of the second button 30, the quantity of the mount holes 133 of the first mount piece 13 and the quantities of the engagement protrusions 153 and the mount recesses 154 of the second mount piece 15 are not restricted in the disclosure and may be modified as required.

Figure 6:
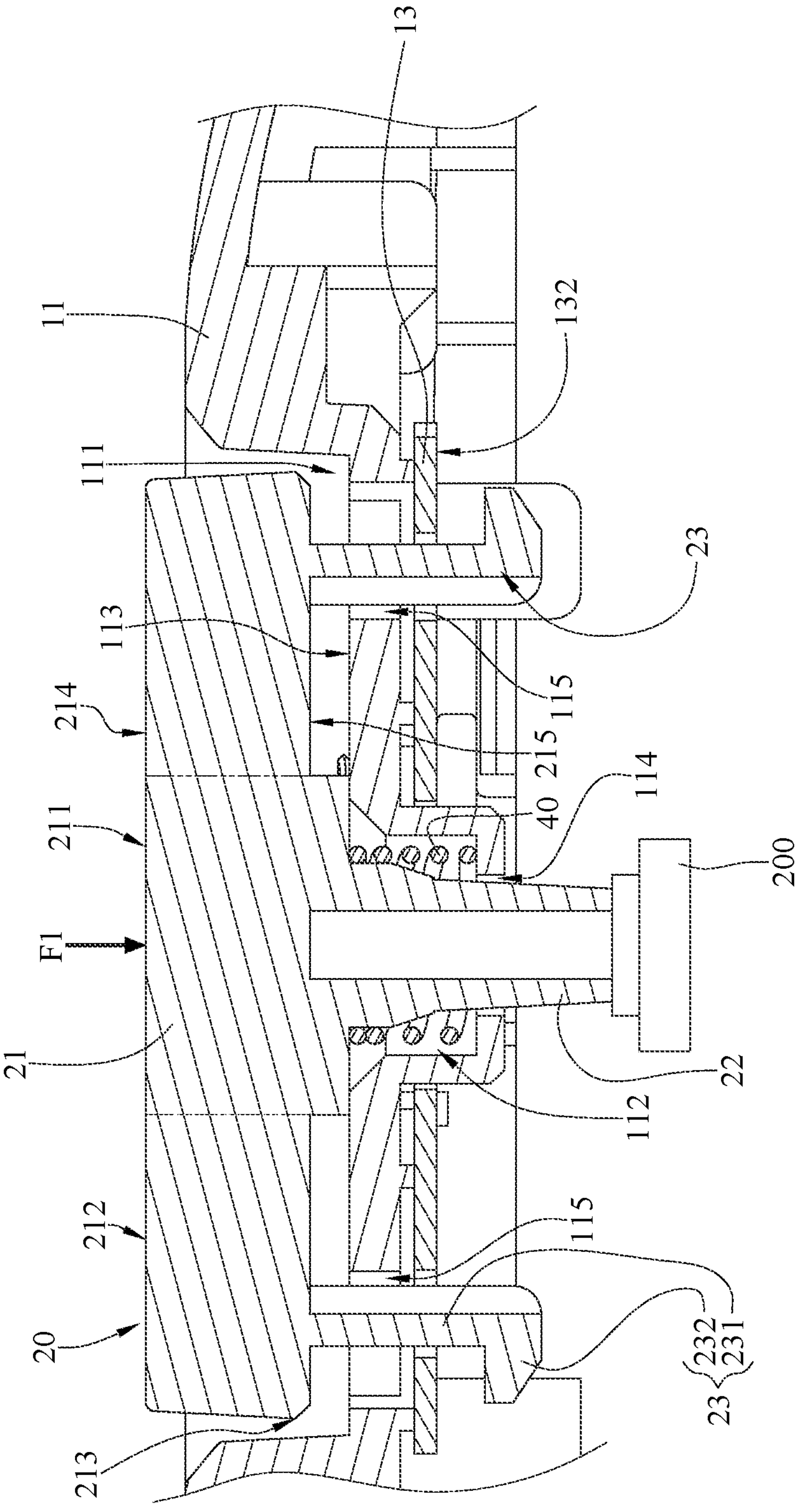
FIG. 6 is a partial enlarged view of the alert device in FIG. 3 when a central portion of a pressed part of a first button is pressed downwards.
Figure 7:
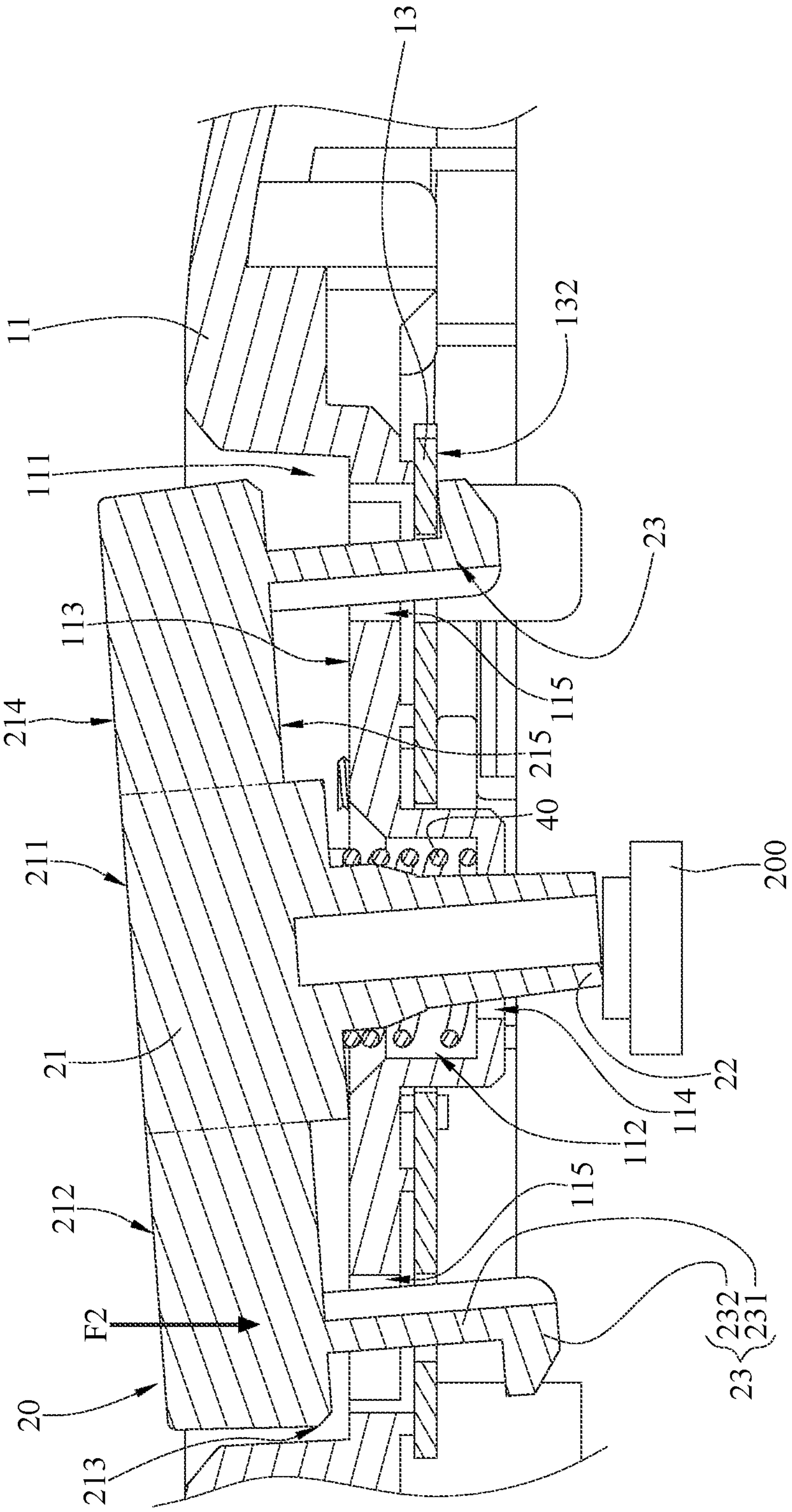
FIG. 7 is a partial enlarged view of the alert device in FIG. 3 when a non-central portion of the pressed part of the first button is pressed downwards.

Then, the following paragraphs will introduce the activation process of the first switch 200 by the first button 20. Refer to FIGS. 6 and 7, FIG. 6 is a partial enlarged view of the alert device 1 in FIG. 3 when the central portion 211 of the pressed part 21 of the first button 20 is pressed downwards, and FIG. 7 is a partial enlarged view of the alert device 1 in FIG. 3 when the non-central portion 212 of the pressed part 21 of the first button 20 is pressed downwards.

As shown in FIG. 6, assuming that the central portion 211 of the pressed part 21 of the first button 20 is pressed downwards by the user (e.g., along the arrow F1), the pressed part 21 of the first button 20 is smoothly moved towards the first stopping surface 113 of the casing 11, all of the hook structures 232 of the hook parts 23 of the first button 20 are disengaged from the pressed surface 132 of the first mount piece 13, and the activation part 22 of the first button 20 is moved in a desired path so as to activate the first switch 200.

As shown in FIG. 7, assuming that a side of the non-central portion 212 of the pressed part 21 of the first button 20 is pressed downwards by the user (e.g., along the arrow F2), another side of the non-central portion 212 of the pressed part 21 of the first button 20 may have a trend to tilt up. In this embodiment, when the pressed part 21 of the first button 20 is not pressed, the hook structures 232 of the hook parts 23 of the first button 20 are already engaged with the pressed surface 132 of the first mount piece 13. Therefore, when a side of the non-central portion 212 of the pressed part 21 of the first button 20 is pressed downwards, the hook structure 232 of at least one of the hook parts 23 connected to another side of the non-central portion 212 is maintained to be engaged with the pressed surface 132 of the first mount piece 13, thereby preventing the pressed part 21 of the first button 20 from tilting up. As a result, the activation part 22 of the first button 20 is ensured to be moved in a desired path so as to activate the first switch 200.

Accordingly, since the hook parts 23 of the first button 20 are connected to the non-central portion 212 of the pressed part 21, and each of the hook parts 23 is respectively disposed through each of the second through holes 115 and is connected to the casing 11, the non-central portion 212 of the pressed part 21 of the first button 20 is prevented from tilting up when the non-central portion 212 of the pressed part 21 of the first button 20 is pressed downwards, thereby ensuring the first button 20 to be moved in a desired path so as to successfully activate the first switch 200.

In this embodiment, the hook structures 232 of the hook parts 23 of the first button 20 are entirely located in the area surrounded by the extension surface S1 of the outer annular edge 213 of the pressed part 21 of the first button 20. Therefore, in the case that the hook parts 23 do not stick out of the extension surface S1 of the outer annular edge 213 of the pressed part 21, the hook parts 23 can be located as close to the outer annular edge 213 of the pressed part 21 as possible. By doing so, not only the pressed part 21 of the first button 20 is ensured not to tilt up, but also the size of the first button recess 111 can be designed to be fit to the size of the pressed part 21 of the first button 20 for achieving aesthetic appearance.

In addition, since the length L1 that the hook structures 232 of the hook parts 23 of the first button 20 protrude from the connection arms 231 is equal to or larger than 1.2 mm, the hook structures 232 of the hook parts 23 of the first button 20 can be firmly engaged with the pressed surface 132 of the first mount piece 13 when the non-central portion 212 of the pressed part 21 of the first button 20 is pressed downwards, thereby further ensuring the non-central portion 212 of the pressed part 21 of the first button 20 not to tilt up.

In this embodiment, since the length L1 that the hook structures 232 of the hook parts 23 of the first button 20 protrude from the connection arms 231 is equal to or larger than 1.2 mm, the second through holes 115 are required to have a specific size for the penetrations of the hook parts 23 of the first button 20 while not damaging the hook parts 23 of the first button 20. In such a case, the first mount piece 13 enables the hook parts 23 of the first button 20 penetrating though the second through holes 115 to be engaged with the first mount piece 13 so as to prevent the pressed part 21 from being tilting up while the non-central portion 212 is pressed downwards.

Note that the first mount piece 13 is an optional structure; in some other embodiments, the button assembly may not include the first mount piece, mounting holes similar to that of the first mount piece may be provided on the casing, the first button recess of the casing may be enlarged, and the pressed part may be maintained to be the square plate. In such an arrangement, after the hook structures of the hook parts of the first button penetrate through the released portions of the mount holes, the hook structures of the hook parts of the first button can be engaged with the casing by rotating the first button. In another embodiment, the button assembly may not include the first mount piece, mounting holes similar to that of the first mount piece may be provided on the casing, and the first button recess of the casing and the pressed part of the first button may be modified to be a round recess and a round plate mating each other.

Moreover, the first button recess 111 and the first accommodation recess 112 of the casing 11 are optional structures; in some other embodiments, the casing may not have the first button recess and the first accommodation recess, and the first through hole and the second through holes may be provided on an outer surface of the casing.

Then, the following will describe the activation process of the second switch 300 by the second button 30. As shown in FIG. 3, the size of the pressed part 31 of the second button 30 is smaller than that of the pressed part 21 of the first button 20, and the size of the pressed part 31 of the second button 30 is approximately equal to the size of the fingertip. Therefore, no matter the position where the finger presses on the pressed part 31 of the second button 30 is aligned with or offset from a central line C2 of the second button 30, the pressed part 31 of the second button 30 can be smoothly moved towards the second stopping surface 118 of the casing 11 (e.g., along a direction D). As a result, the activation part 32 of the second button 30 is ensured to be moved in a desired path so as to activate the second switch 300.

Note that the second button 30 is an optional component; in some other embodiments, the button assembly may not include the second button and the corresponding components and structures corresponding thereto.

Figure 8:
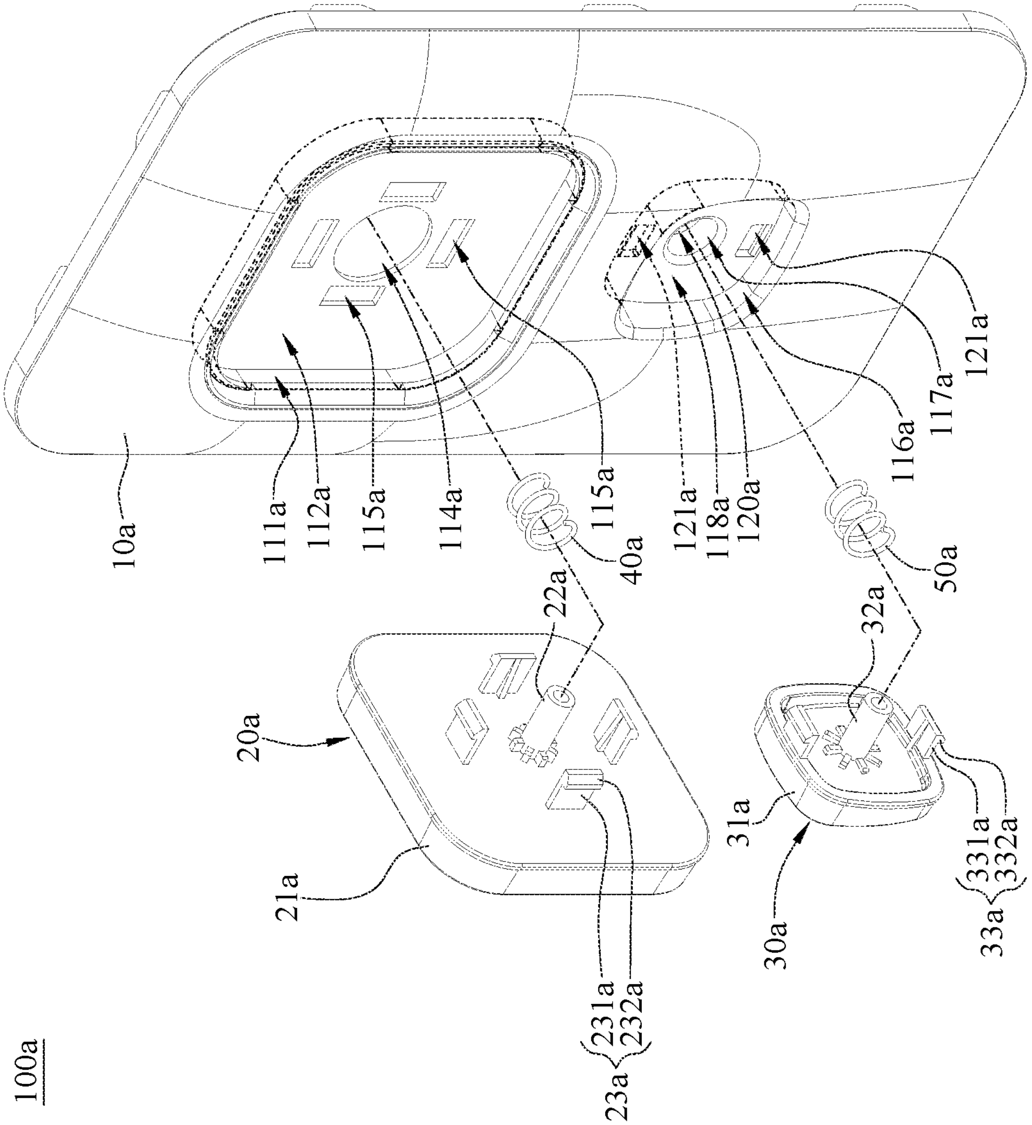
FIG. 8 is an exploded view of a button assembly of an alert device according to a second embodiment of the disclosure.
Figure 9:
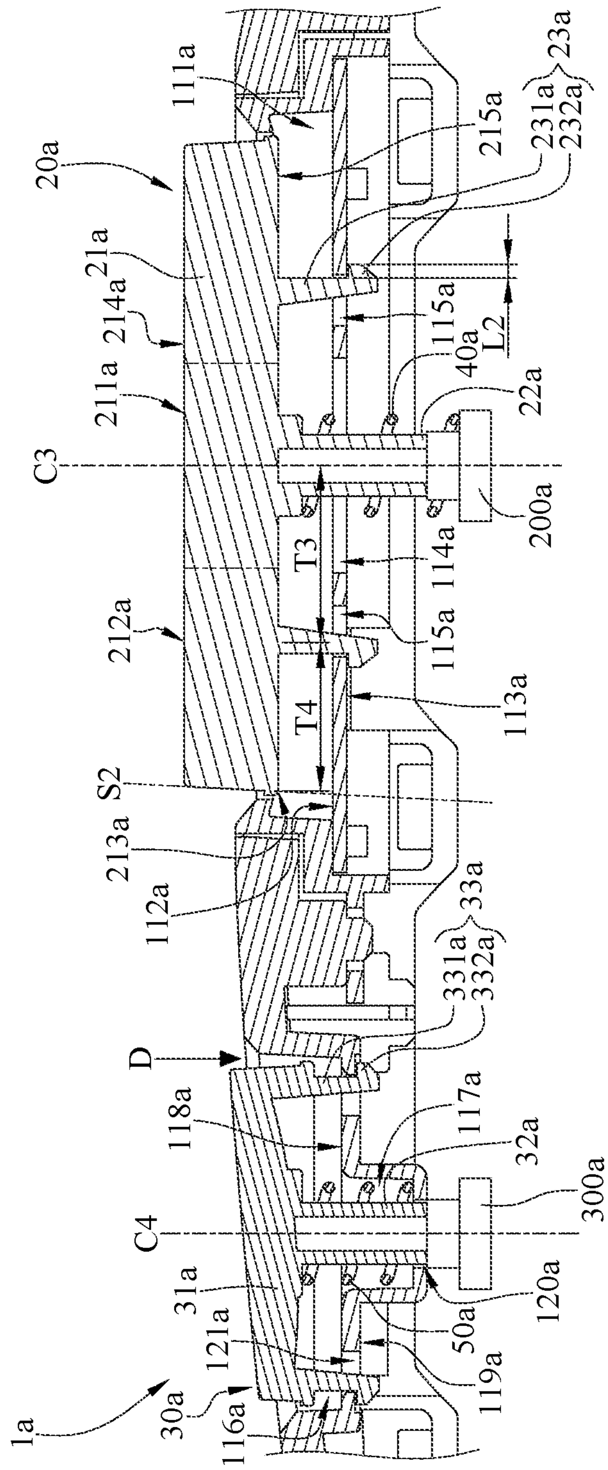
FIG. 9 is a cross-sectional view of the alert device in FIG. 8.

Refer to FIGS. 8 and 9, where FIG. 8 is an exploded view of a button assembly 100*a* of an alert device 1*a* according to a second embodiment of the disclosure, and FIG. 9 is a cross-sectional view of the alert device 1*a* in FIG. 8.

In this embodiment, the alert device 1*a* includes the button assembly 100*a* and a first switch 200*a*. In addition, the alert device 1*a* may further include a second switch 300*a* and other components, such as a base, a circuit board and so on. In order to clearly show the structures of the button assembly 100*a* and the activation processes of the first switch 200*a* and the second switch 300*a* by the button assembly 100*a*, parts of the alert device 1*a* are omitted in figures, and the figures merely show the button assembly 100*a*, the first switch 200*a* and the second switch 300*a*.

The button assembly 100*a* includes a casing 10*a* and a first button 20*a*. In addition, the button assembly 100*a* may further include a second button 30*a*, a first elastic component 40*a* and a second elastic component 50*a*.

In this embodiment, figures merely show one part of the casing 10*a* and omit the other part of the casing 10*a* for clearly showing the connections among the casing 10*a*, the first button 20*a*, the second button 30*a*, the first elastic component 40*a* and the second elastic component 50*a*.

The casing 10*a* has a first button recess 111*a*, a first stopping surface 112*a*, a first pressed surface 113*a*, a first through hole 114*a*, a plurality of second through holes 115*a*, a second button recess 116*a*, an accommodation recess 117*a*, a second stopping surface 118*a*, a second pressed surface 119*a*, a third through hole 120*a* and a plurality of fourth through holes 121*a*. The first stopping surface 112*a* is located in the first button recess 111*a* and faces an opening of the first button recess 111*a*, and the first pressed surface 113*a* faces away from the first stopping surface 112*a*. The first through hole 114*a* and the second through holes 115*a* penetrate through the first stopping surface 112*a* and the first pressed surface 113*a*, and the second through holes 115*a* are located at a periphery of the first through hole 114*a*. The second stopping surface 118*a* is located at the bottom of the second button recess 116*a* and faces an opening of the second button recess 116*a*. The accommodation recess 117*a* is recessed from the second stopping surface 118*a* and connected to the second button recess 116*a*. The second pressed surface 119*a* faces away from the second stopping surface 118*a*. The third through hole 120*a* is located at one side of the accommodation recess 117*a* located opposite to the second button recess 116*a*, and the fourth through holes 121*a* penetrate through the second stopping surface 118*a* and the second pressed surface 119*a*.

The first button 20*a* includes a pressed part 21*a*, an activation part 22*a* and a plurality of hook parts 23*a*. The pressed part 21*a* is, for example, a square plate with a side length larger than 15 mm, such as a square plate with a side length of 25 mm. The pressed part 21*a* is configured to be pushed by, for example, a finger of a user. The pressed part 21*a* has a central portion 211*a*, a non-central portion 212*a* and an outer annular edge 213*a*. The central portion 211*a* is an extent of a projection of the finger on the pressed part 21*a* when the fingertip is aligned with a central line C3 of the central portion 211*a* (e.g., the extent of a diameter of about 12 mm), where the central line C3 is, for example, approximately perpendicular to a surface of the pressed part 21*a* that is for the contact of the finger. The non-central portion 212*a* of the pressed part 21*a* surrounds the central portion 211*a*, and the central portion 211*a* and the non-central portion 212*a* together form a first surface 214*a* and a second surface 215*a* facing away from the first surface 214, and the outer annular edge 213*a* surrounds the non-central portion 212*a* and is connected to a periphery of the second surface 215*a*. The activation part 22*a* is connected to the central portion 211*a* and located at the second surface 215*a*, and the hook parts 23*a* are connected to the non-central portion 212*a* and located at the second surface 215*a*. Then, the following will introduce the detail structures of the hook parts 23*a*. Each of the hook parts 23*a* includes a connection arm 231*a* and a hook structure 232*a*. In each of the hook parts 23*a*, the connection arm 231*a* is connected to the non-central portion 212*a* of the pressed part 21*a* and located at the second surface 215*a*, the hook structure 232*a* protrudes from the connection arm 231*a*, and an extension direction of the connection arm 231*a* from the non-central portion 212*a* is different from a protruding direction of the hook structure 232*a* from the connection arm 231*a*, where a length L2 that the hook structure 232*a* protrudes from the connection arm 231*a* is about 0.8 mm. A distance T3 from the connection arm 231*a* of each of the hook parts 23*a* to the central line of the activation part 22*a* (e.g., coaxial with the central line C3 of the central portion 211*a*) is larger than a distance T4 from the connection arm 231*a* of each of the hook parts 23*a* to an extension surface S2 of the outer annular edge 213*a*. The hook structures 232*a* of the hook parts 23*a* are entirely located in an area surrounded by the extension surface S2 of the outer annular edge 213*a*.

The activation part 22*a* of the first button 20*a* is disposed through the first through hole 114*a* of the casing 10*a*, the first stopping surface 112*a* of the casing 10*a* faces the second surface 215*a* of the pressed part 21*a* of the first button 20*a*. Each of the connection arms 231*a* of the hook parts 23*a* of the first button 20*a* is respectively disposed through each of the second through holes 115*a* of the casing 10*a*, and the hook structures 232*a* of the hook parts 23*a* are engaged with the first pressed surface 113*a* of the casing 10*a*. The first switch 200 is, for example, an alert switch. The first switch 200*a* is located in the casing 10*a* and corresponds to the activation part 22*a* of the first button 20*a*.

The second button 30*a* includes a pressed part 31*a*, an activation part 32*a* and a plurality of hook parts 33*a*. A size of the pressed part 31*a* of the second button 30*a* is smaller than that of the pressed part 21*a* of the first button 20*a*. The pressed part 31*a* of the second button 30*a* is, for example, a square plate with a side length smaller than or equal to 15 mm. The activation part 32*a* and the hook parts 33*a* are connected to the pressed part 31*a*, and the hook parts 33*a* are located at a periphery of the activation part 32*a*. Each of the hook parts 33*a* includes a connection arm 331*a* and a hook structure 332*a*. In each of the hook parts 33*a*, the connection arm 331*a* is connected to the pressed part 31*a*, the hook structure 332*a* protrudes from the connection arm 331*a*, and an extension direction of the connection arm 331*a* from the pressed part 31*a* is different from a protruding direction of the hook structure 332*a* from the connection arm 331*a*.

The activation part 32*a* of the second button 30*a* is disposed through the third through hole 120*a* of the casing 10*a*, and the second stopping surface 118*a* of the casing 10*a* faces the pressed part 31*a*. Each of the connection arms 331*a* of the hook parts 33*a* of the second button 30*a* is respectively disposed through each of the fourth through holes 121*a* of the casing 10*a*, and the hook structures 332*a* of the hook part 33*a* of the second button 30*a* are engaged with the second pressed surface 119*a* of the casing 10*a*. The second switch 300*a* is, for example, a power switch or a switch of another function. The second switch 300*a* is located in the casing 10*a* and corresponds to the activation part 32*a* of the second button 30*a*.

The first elastic component 40*a* is, for example, a compression spring. Two opposite sides of the first elastic component 40*s* respectively press against the pressed part 21*a* of the first button 20*a* and the first switch 200*a*. The first elastic component 40*a* is configured to force the pressed part 21*a* to move away from the first stopping surface 112*a*. The second elastic component 50*a* is, for example, a compression spring. The second elastic component 50*a* is located in the accommodation recess 117*a*, and two opposite ends of the second elastic component 50*a* respectively press against the pressed part 31*a* of the second button 30*a* and an inner bottom surface of the accommodation recess 117*a*. The second elastic component 50*a* is configured to force the pressed part 31*a* to move away from the second stopping surface 118*a*.

Figure 10:
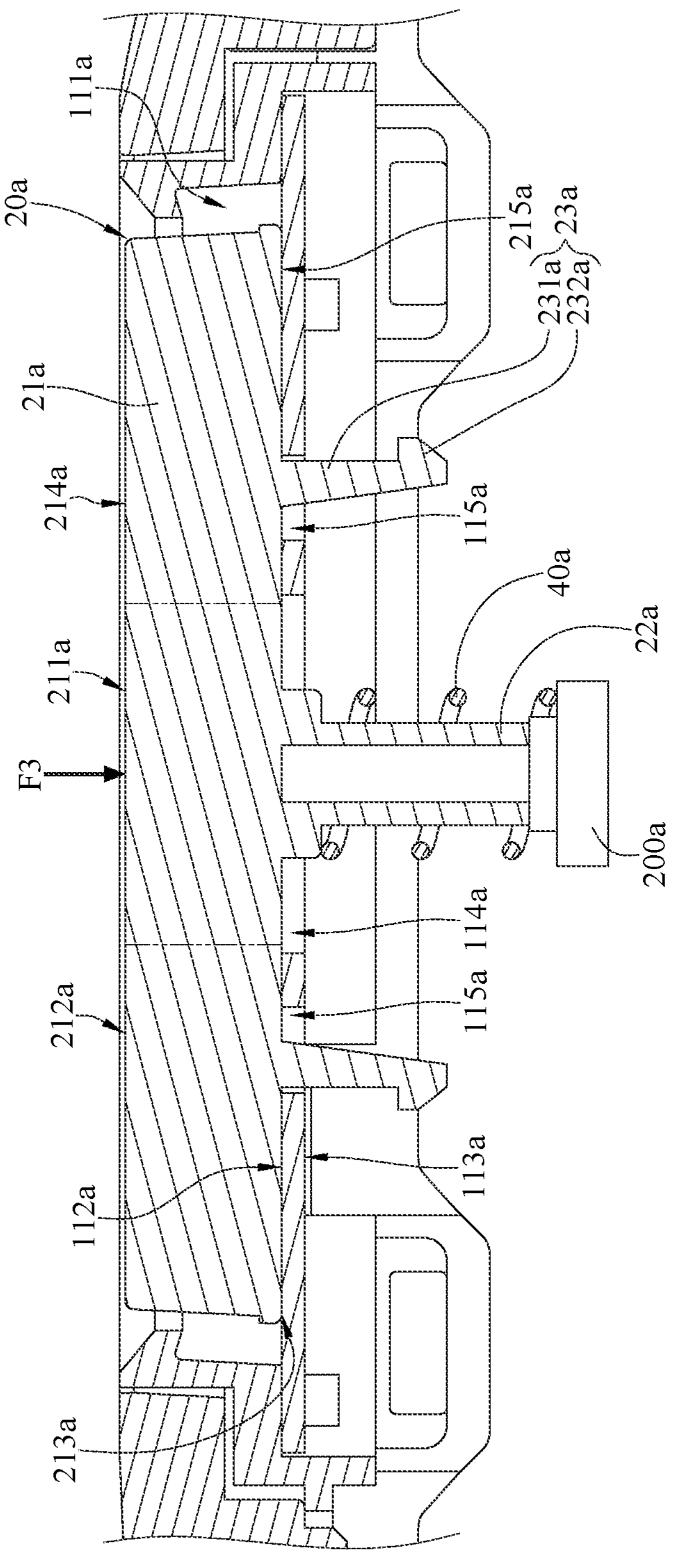
FIG. 10 is a partial enlarged view of the alert device in FIG. 9 when a central portion of a pressed part of a first button is pressed downwards.
Figure 11:
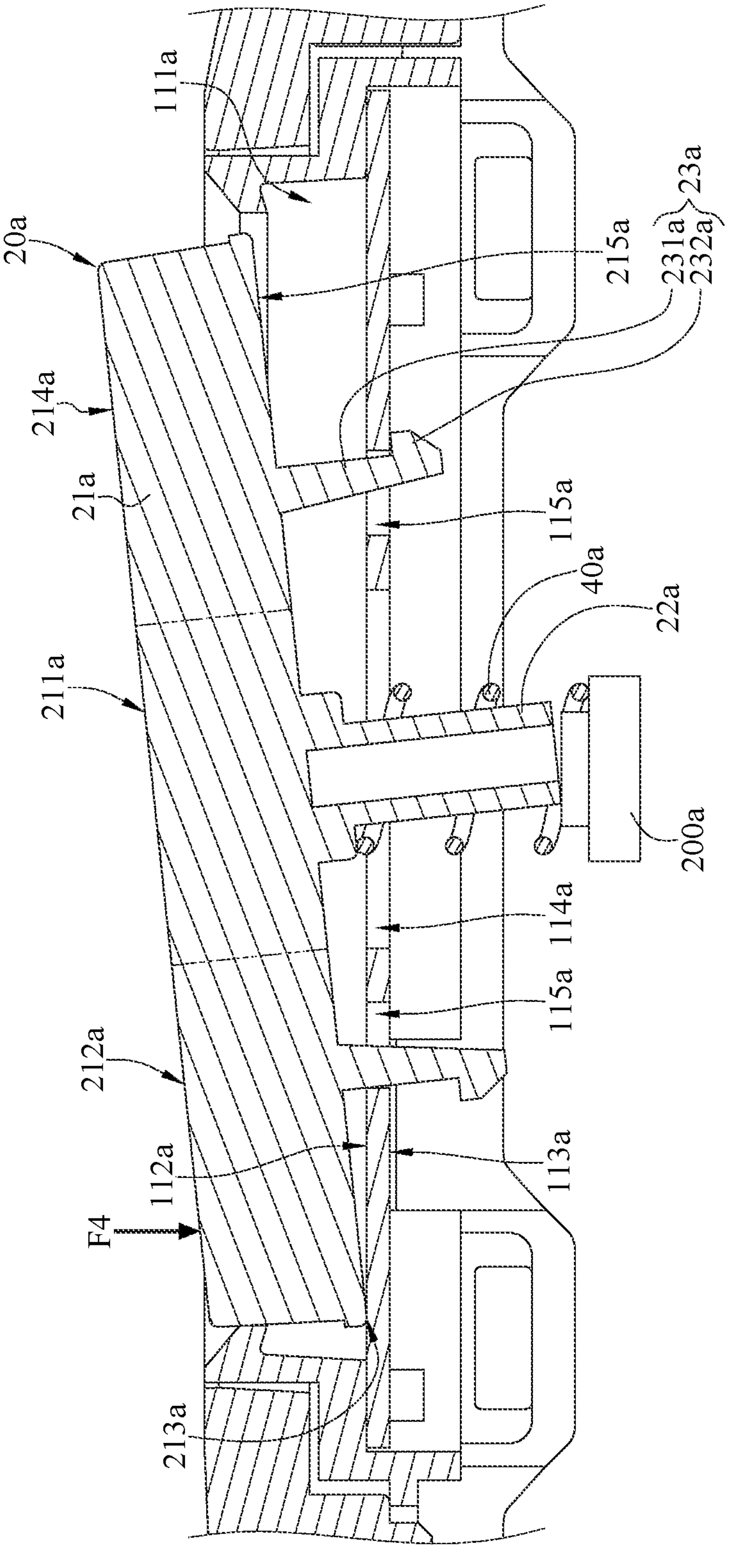
FIG. 11 is a partial enlarged view of the alert device in FIG. 9 when a non-central portion of the pressed part of the first button is pressed downwards.

Then, the following paragraphs will introduce the activation process of the first switch 200*a* by the first button 20*a*. Refer to FIGS. 10 and 11, where FIG. 10 is a partial enlarged view of the alert device 1*a* in FIG. 9 when the central portion 211*a* of the pressed part 21*a* of the first button 20*a* is pressed downwards, and FIG. 11 is a partial enlarged view of the alert device 1*a* in FIG. 9 when the non-central portion 212*a* of the pressed part 21*a* of the first button 20*a* is pressed downwards.

As shown in FIG. 10, assuming that the central portion 211*a* of the pressed part 21*a* of the first button 20*a* is pressed downwards by the user (e.g., along the arrow F3), the pressed part 21*a* of the first button 20*a* is smoothly moved towards the first stopping surface 112*a* of the casing 10*a*, all of the hook structures 232*a* of the hook parts 23*a* of the first button are disengaged from the first pressed surface 113*a* of the casing 10*a*, and the activation part 22*a* of the first button 20*a* is moved in a desired path so as to activate the first switch 200*a*.

As shown in FIG. 11, assuming that a side of the non-central portion 212*a* of the pressed part 21*a* of the first button 20*a* is pressed downwards by the user (e.g., along the arrow F4), another side of the non-central portion 212*a* of the pressed part 21*a* of the first button 20*a* may have a trend to tilt up. In this embodiment, when the pressed part 21*a* of the first button 20*a* is not pressed, the hook structures 232*a* of the hook parts 23*a* of the first button 20*a* are already engaged with the first pressed surface 113*a* of the casing 10*a*. Therefore, when a side of the non-central portion 212*a* of the pressed part 21*s* of the first button 20*a* is pressed downwards, the hook structure 232*a* of at least one of the hook parts 23*a* connected to another side of the non-central portion 212*a* is maintained to be engaged with the first pressed surface 113*a* of the casing 10*a*, thereby preventing the pressed part 21*a* of the first button 20*a* from tilting up. As a result, the activation part 22*a* of the first button 20*a* is ensured to be moved in a desired path so as to activate the first switch 200*a*.

Accordingly, since the hook parts 23*a* of the first button 20*a* are connected to the non-central portion 212*a* of the pressed part 21*a*, and each of the hook parts 23*a* is respectively disposed through each of the second through holes 115*a* and is engaged with the casing 11, the non-central portion 212*a* of the pressed part 21*a* of the first button 20*a* is prevented from tilting up when the non-central portion 212*a* of the pressed part 21*a* of the first button 20*a* is pressed downwards, thereby ensuring the first button 20*a* to be moved in a desired path so as to successfully activate the first switch 200*a*.

In addition, since the length L2 that the hook structures 232*a* of the hook parts 23*a* of the first button 20*a* protrude from the connection arms 231*a* is about 0.8 mm, the hook structures 232*a* of the hook parts 23*s* of the first button 20*a* can be firmly engaged with the first pressed surface 113*a* of the casing 10*a* when the non-central portion 212*a* of the pressed part 21*a* of the first button 20*a* is pressed downwards, thereby further ensuring the non-central portion 212*a* of the pressed part 21*a* of the first button 20*a* not to tilt up.

In this embodiment, in order to ensure the hook structures 232*a* of the hook parts 23*a* of the first button 20 not to be damaged and to be engaged with first pressed surface 113*a* of the casing 10*a* after being disposed through the second through holes 115*a*, the length L2 that the hook structures 232*a* of the hook parts 23*a* of the first button 20*a* protrude from the connection arms 231*a* is set to be about 0.8 mm in maximum for preventing the pressed part 21*a* of the first button 20*a* from tilting up. Note that the length L2 that the hook structures 232*a* of the hook parts 23*a* of the first button 20*a* protrude from the connection arms 231*a* is not restricted to being about 0.8 mm; in some other embodiments, the material of the first button may be modified to increase the elasticity of the hook parts of the first button, such that even if the length that the hook structures of the hook parts of the first button protrude from the connection arms is larger than 0.8 mm, the hook structures of the hook parts of the first button are still ensured not to be damaged and able to be engaged with first pressed surface of the casing after being disposed through the second through holes, thereby further ensuring the pressed part 21*a* of the first button 20*a* not to tilt up.

Then, the following will describe the activation process of the second switch 300*a* by the second button 30*a*. As shown in FIG. 9, the size of the pressed part 31*a* of the second button 30*a* is smaller than that of the pressed part 21*a* of the first button 20*a*, and the size of the pressed part 31*a* of the second button 30*a* is approximately equal to the size of the fingertip. Therefore, no matter the position where the finger presses on the pressed part 31*a* of the second button 30*a* is aligned with or offset from a central line C4 of the second button 30*a*, the pressed part 31*a* of the second button 30*a* can be smoothly moved towards the second stopping surface 118*a* of the casing 10*a* (e.g., along a direction D). As a result, the activation part 32*a* of the second button 30*a* is ensured to be moved in a desired path so as to activate the second switch 300*a*.

According to the buttons, the button assemblies and the alert devices as described above, since the hook parts of the first button are connected to the non-central portion of the pressed part, and each of the hook parts is respectively disposed through each of the second through holes and is connected to the casing, the non-central portion of the pressed part of the first button is prevented from tilting up when the non-central portion of the pressed part of the first button is pressed downwards, thereby ensuring the first button to be moved in a desired path so as to successfully activate the first switch.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A button assembly, for activating a switch, comprising:

a casing, having a first through hole and a plurality of second through holes;

a button, comprising a pressed part, an activation part and a plurality of hook parts, wherein the pressed part has a central portion and a non-central portion, the non-central portion is connected to the central portion, the activation part is connected to the central portion, the plurality of hook parts are connected to the non-central portion, the activation part is disposed through the first through hole, and each of the plurality of hook parts is respectively disposed through each of the plurality of second through holes, and the plurality of hook parts are connected to the casing; and a mount piece, mounted on the casing, wherein the plurality of hook parts are disposed through the mount piece and are directly engaged with the mount piece.

2. The button assembly according to claim 1, wherein the casing has a stopping surface, and at least part of each of the plurality of hook parts is located at one side of the casing located opposite to the stopping surface.

3. The button assembly according to claim 2, further comprising an elastic component, wherein the elastic component is disposed at the pressed part, and the pressed part is forced away from the stopping surface via the elastic component selectively.

4. The button assembly according to claim 1, wherein the pressed part has an outer annular edge, and a distance from each of the plurality of hook parts to the activation part is greater than a distance from each of the plurality of hook parts to the outer annular edge.

5. The button assembly according to claim 1, wherein each of the plurality of hook parts comprises a connection arm and a hook structure, the connection arm is connected to the non-central portion of the pressed part, and the hook structure protrudes from the connection arm.

6. The button assembly according to claim 5, wherein the pressed part has an outer annular edge, and the hook structure of each of the plurality of hook parts is entirely located in an area surrounded by an extension surface of the outer annular edge.

7. The button assembly according to claim 5, wherein the mount piece has a plurality of mounting holes, each of the plurality of mounting holes is respectively connected to each of the plurality of second through holes, each of the plurality of mounting holes has a released portion and an engagement portion connected to each other, the engagement portion has a width smaller than a width of the released portion, the connection arm of each of the plurality of hook parts is respectively disposed through the engagement portion of each of the plurality of mounting holes, and the hook structure of each of the plurality of hook parts is engaged with the mount piece.

8. The button assembly according to claim 7, wherein the casing has two guiding protrusions, the mount piece has two curved guiding holes, and the two guiding protrusions are located in the two curved guiding holes.

9. The button assembly according to claim 7, wherein a quantity of the plurality of hook parts of the button is four, a quantity of the plurality of second through holes of the casing is four, and a quantity of the plurality of mounting holes of the mount piece is four.

10. The button assembly according to claim 5, further comprising a mount piece connected to the casing, the mount piece has a through hole, an inner annular surface, a plurality of engagement protrusions and a plurality of mount recesses, the inner annular surface forms the through hole, the plurality of engagement protrusions protrude from the inner annular surface, each of the plurality of mount recesses is formed between two of the plurality of engagement protrusions located adjacent to each other, the connection arm of each of the plurality of hook parts is disposed through the through hole, and the hook structure of each of the plurality of hook parts is respectively engaged with each of the plurality of engagement protrusions.

11. The button assembly according to claim 1, wherein the mount piece has a plurality of mounting holes, each of the plurality of mounting holes is respectively connected to each of the plurality of second through holes, and the casing has a stopping surface, each of the plurality of hook parts is respectively disposed through each of the plurality of second through holes and each of the plurality of mounting holes, and at least part of each of the plurality of hook parts is located at one side of the casing located opposite to the stopping surface.

12. An alert device, comprising:

a button assembly, comprising:

a casing, having a first through hole and a plurality of second through holes;

a button, comprising a pressed part, an activation part and a plurality of hook parts, wherein the pressed part has a central portion and a non-central portion, the non-central portion is connected to the central portion, the activation part is connected to the central portion, the plurality of hook parts are connected to the non-central portion, the activation part is disposed through the first through hole, each of the plurality of hook parts is respectively disposed through each of the plurality of second through holes, and the plurality of hook parts are connected to the casing; and a mount piece, mounted on the casing, wherein the plurality of hook parts are disposed through the mount piece and are directly engaged with the mount piece; and an alert switch, disposed corresponding to the activation part.

13. The alert device according to claim 12, wherein the casing has a stopping surface, and at least part of each of the plurality of hook parts is located at one side of the casing located opposite to the stopping surface.

14. The alert device according to claim 12, wherein the pressed part has an outer annular edge, and a distance from each of the plurality of hook parts to the activation part is greater than a distance from each of the plurality of hook parts to the outer annular edge.

15. The alert device according to claim 12, wherein each of the plurality of hook parts comprises a connection arm and a hook structure, the connection arm is connected to the non-central portion of the pressed part, and the hook structure protrudes from the connection arm.

16. The alert device according to claim 15, wherein the pressed part has an outer annular edge, and the hook structure of each of the plurality of hook parts is entirely located in an area that is surrounded by an extension surface of the outer annular edge.

17. The alert device according to claim 15, wherein the mount piece has a plurality of mounting holes, each of the plurality of mounting holes is respectively connected to each of the plurality of second through holes, each of the plurality of mounting holes has a released portion and an engagement portion connected to each other, the engagement portion has a width smaller than a width of the released portion, the connection arm of each of the plurality of hook parts is respectively disposed through the engagement portion of each of the plurality of mounting holes, and the hook structure of each of the plurality of hook parts is engaged with the mount piece.

18. The alert device according to claim 15, wherein the mount piece has a through hole, an inner annular surface, a plurality of engagement protrusions and a plurality of mount recesses, the inner annular surface forms the through hole, the plurality of engagement protrusions protrude from the inner annular surface, each of the plurality of mount recesses is formed between two of the plurality of engagement protrusions which are located adjacent to each other, the connection arm of each of the plurality of hook parts is disposed through the through hole, and the hook structure of each of the plurality of hook parts is respectively engaged with each of the plurality of engagement protrusions.

19. A button, comprising:

a pressed part, having a central portion, a non-central portion and an outer annular edge, wherein the non-central portion is connected to the central portion, and the outer annular edge is connected to the non-central portion;

an activation part, connected to the central portion; and a plurality of hook parts, connected to the non-central portion, wherein a distance from each of the plurality of hook parts to the activation part is greater than a distance from each of the plurality of hook parts to the outer annular edge;

wherein each of the plurality of hook parts comprises a connection arm and a hook structure, the connection arm is connected to the non-central portion of the pressed part, and the hook structure protrudes from the connection arm, an extension direction of the connection arm from the non-central portion is different from a protruding direction of the hook structure from the connection arm, and a length that the hook structure protrudes from the connection arm is equal to or larger than 0.8 mm.

* * * * *